(12) United States Patent
Collins

(10) Patent No.: US 7,748,289 B2
(45) Date of Patent: Jul. 6, 2010

(54) PUSH ROD TO BRAKE PEDAL ASSEMBLY AND METHOD OF ASSEMBLY

(75) Inventor: Allen R. Collins, Ortonville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 829 days.

(21) Appl. No.: 11/550,456

(22) Filed: Oct. 18, 2006

(65) Prior Publication Data
US 2007/0193394 A1   Aug. 23, 2007

Related U.S. Application Data

(63) Continuation-in-part of application No. 11/341,547, filed on Jan. 27, 2006, now abandoned.

(51) Int. Cl.
*G05G 1/30* (2008.04)
(52) U.S. Cl. .......................................... 74/512
(58) Field of Classification Search ................... 74/512, 74/513, 560
See application file for complete search history.

(56) References Cited

U.S. PATENT DOCUMENTS

| | | | | |
|---|---|---|---|---|
| 3,388,610 A | * | 6/1968 | Pyle et al. | 74/512 |
| 5,551,317 A | * | 9/1996 | Gautier et al. | 74/560 |
| 5,685,200 A | * | 11/1997 | Baumann | 74/512 |
| 6,142,036 A | * | 11/2000 | Mizuma et al. | 74/512 |

* cited by examiner

*Primary Examiner*—Vicky A Johnson

(57) ABSTRACT

The invention concerns a push rod bracket assembly for use with a brake pedal assembly and method of assembly thereto. A pedal attachment pin is fixed to a brake pedal arm, and a booster clevis is mounted to the pin. The booster clevis may have a retainer clevis leg that mounts around the pin on one side of the arm and a slotted clevis leg with a slot that slides over the pin on the other side of the arm. A wave washer may be mounted in compression between the arm and slotted clevis leg to bias the leg. A retainer clip or retainer spring may engage the pin to secure the retainer clevis leg on the pin. The retainer clevis leg may include a ramp and the slotted clevis leg may include a taper to assist in assembly.

15 Claims, 5 Drawing Sheets

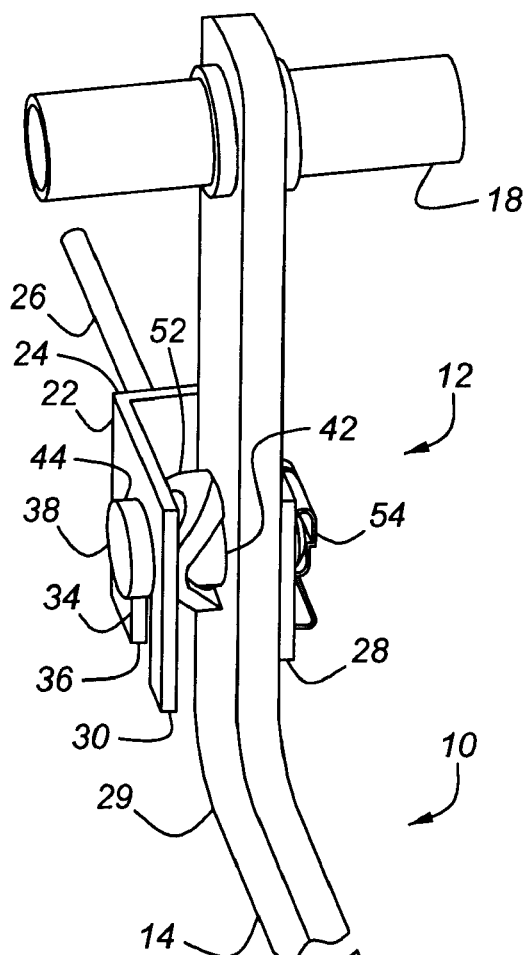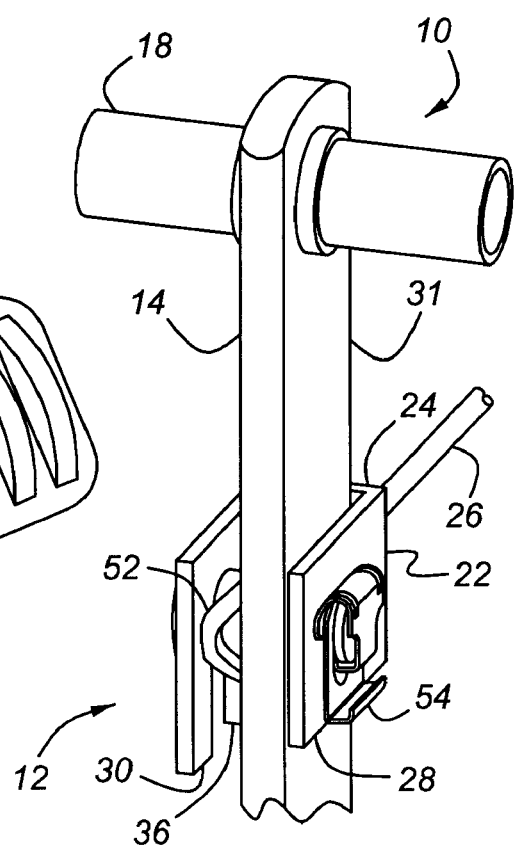
Fig. 1
Fig. 2

PUSH ROD TO BRAKE PEDAL ASSEMBLY AND METHOD OF ASSEMBLY

CROSS REFERENCE TO RELATED APPLICATIONS

This application is a continuation-in-part and claims the benefit of U.S. Ser. No. 11/341,547, filed Jan. 27, 2006, which is incorporated herein by reference.

BACKGROUND OF THE INVENTION

The present invention relates generally to an assembly connecting a pedal to a component, and in particular to an assembly for engaging a brake booster to a brake pedal in a vehicle and a method of assembly.

Brake pedal assemblies employed in automotive vehicles typically have a pivot location near the top of a brake pedal arm, a brake pedal at the bottom of the arm, and an assembly near the middle of the arm for connecting a brake booster push rod to the brake pedal arm while allowing some pivoting motion between the two. Such assemblies may include for example, a push rod having an eyelet on one end that is secured around a pin extending from the brake pedal arm, with a cotter pin or other type of retainer clip mounted on the pin to prevent the eyelet from slipping off. In another example, the assembly includes a clevis having arms that mount on either side of the brake pedal arm, with a pin that is slid through holes in the clevis and arm after the clevis is properly located on the arm. A cotter pin or other type of retainer clip is employed to prevent the pin from sliding back out of the holes. However, if the cotter pin or retainer is missing, due to breakage or other means, a potential exists for the connection between the brake pedal arm and booster push rod to be less than secure.

Other attachment methods overcome this concern by, for example, the use of multiple piece booster input rods, or by employing redundant (secondary) retention means. These methods, however, may be more costly or complicated than it is desirable.

It is desirable, therefore, to provide a means for attaching a booster push rod to a brake pedal arm that does not rely solely on a cotter pin or retainer member to assure secure attachment of the two, while also minimizing the cost and complexity for the attachment means.

SUMMARY OF THE INVENTION

An embodiment may contemplate a push rod bracket assembly for linking a brake pedal assembly, having a brake pedal arm, to a booster assembly. The push rod bracket assembly may comprise a booster clevis including a push rod support wall having a booster push rod extending therefrom and adapted to engage the booster assembly, a retainer clevis leg extending from the push rod support wall, and a slotted clevis leg extending from the push rod support wall and spaced from the retainer clevis leg. The slotted clevis leg may include a pin slot with a slot opening and an outer surface and be adapted to mount on a first side of the brake pedal arm. The retainer clevis leg includes a pin hole therethrough and is adapted to mount on an opposed second side of the brake pedal arm. Also, the push rod bracket assembly may comprise a pedal attachment pin having a pedal arm attachment portion adapted to be fixed to the brake pedal arm, a retainer portion extending from the brake pedal arm attachment portion and through the pin hole in the retainer clevis leg, a spacer portion extending from the brake pedal arm attachment portion and through the pin slot, and a retention head pin portion extending from the spacer portion and engaging with the outer surface of the slotted clevis leg.

An embodiment may contemplate a brake pedal and bracket assembly for engaging a booster assembly. The brake pedal and bracket assembly may comprise a brake pedal arm having a first side and an opposed second side, and a bracket attachment hole extending from the first side to the second side, a booster clevis, pedal attachment pin and biaser. The booster clevis may include a push rod support wall having a booster push rod extending therefrom and adapted to engage the booster assembly, a first clevis leg extending from the push rod support wall and mounted adjacent to the first side, and a second clevis leg extending from the push rod support wall and mounted adjacent to the second side, the first and second clevis legs each including a bore aligned with the bracket attachment hole. The pedal attachment pin may be fixed to the brake pedal arm and have a pedal arm attachment portion extending through the bracket attachment hole, a spacer portion extending from the brake pedal arm attachment portion and through the bore in the first clevis leg, and a retention head portion extending from the spacer portion and engaging with the first clevis leg. The biaser may be mounted between the first side of the brake pedal arm and the first clevis leg, and bias the first clevis leg away from the first side.

A method of assembling a push rod bracket assembly to a brake pedal assembly, the method comprising the steps of: mounting a biaser on a pedal attachment pin; inserting the pedal attachment pin through a bracket attachment hole in a brake pedal arm with the biaser on a first side of the brake pedal arm; fixing the pedal attachment pin to the brake pedal arm; mounting a pin hole of a retainer clevis leg about the pedal attachment pin adjacent to an opposed second side of the brake pedal arm; and sliding a pin slot of a slotted clevis leg onto the pedal attachment pin between the biaser and a retention head portion of the pedal attachment pin such that the biaser is compressed between the first side of the brake pedal arm and the slotted clevis leg.

An advantage of an embodiment is that the attachment of the booster push rod to the brake pedal arm remains secure, even in the event of a missing or broken retainer clip or spring.

Another advantage of an embodiment is that the secure connection between the booster push rod and brake pedal arm is relatively cost-effective and easy to assemble.

BRIEF DESCRIPTION OF THE DRAWINGS

FIG. 1 is a perspective view of a portion of a brake pedal assembly, in accordance with a first embodiment.

FIG. 2 is a perspective view of an upper portion of the brake pedal assembly of FIG. 1.

DETAILED DESCRIPTION

Figure 3:
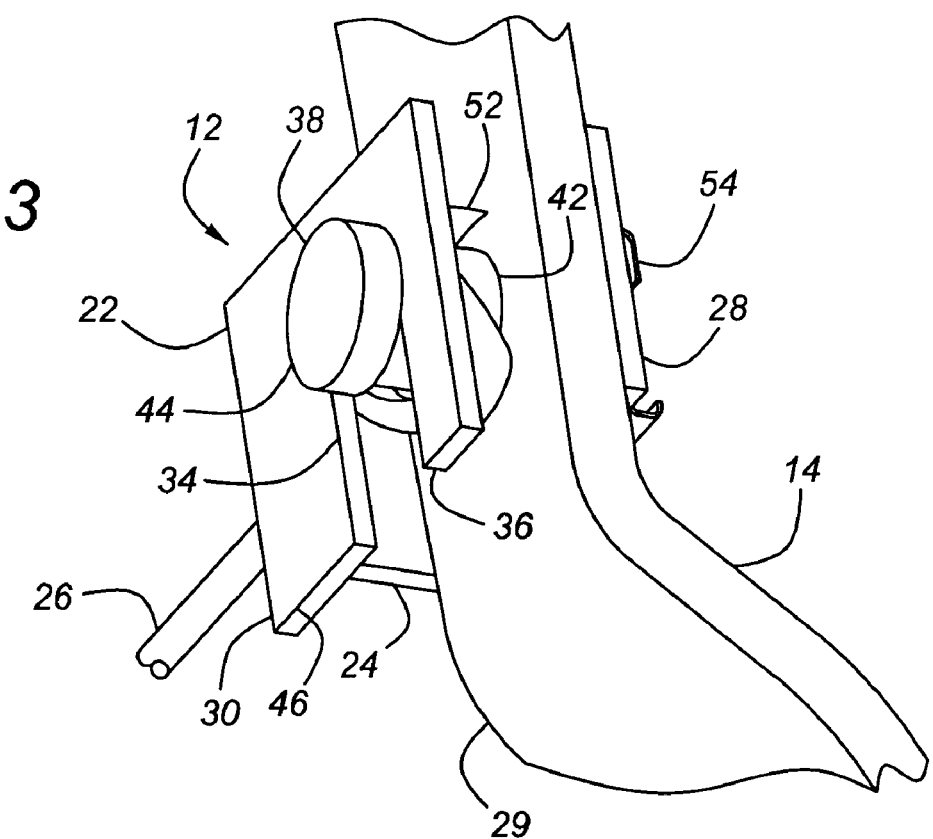
FIG. 3 is a perspective view, on an enlarged scale, of a portion of the brake pedal assembly of FIG. 1, showing the slotted side of the push rod bracket assembly.
Figure 4:
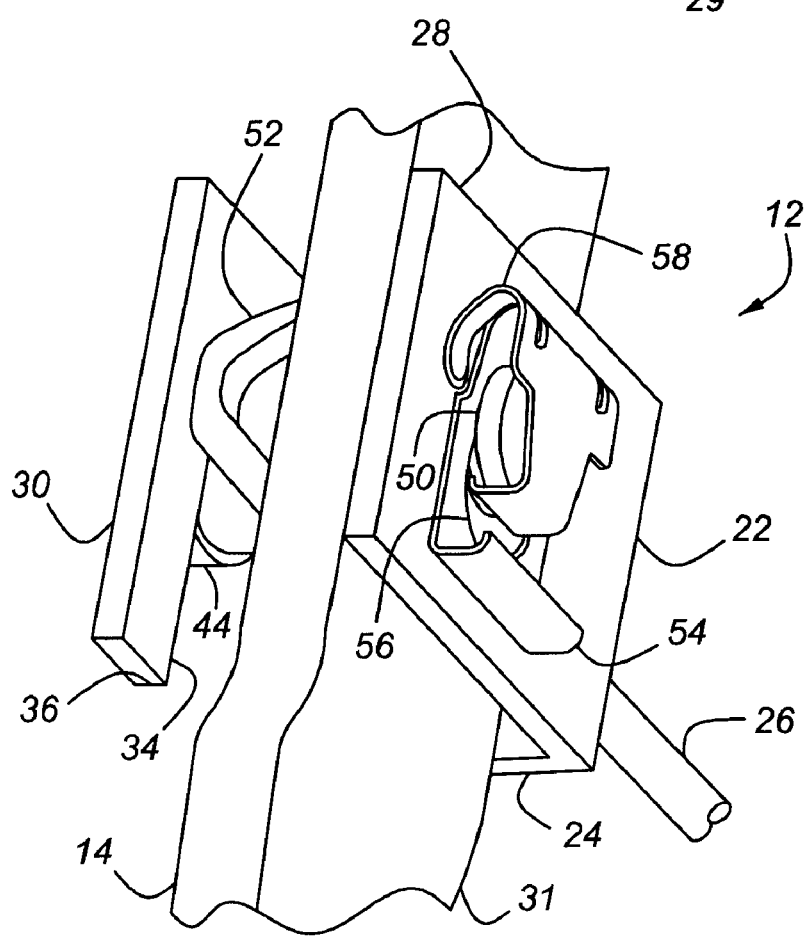
FIG. 4 is a perspective view, on an enlarged scale, of a portion of the brake pedal assembly of FIG. 1, showing the retainer clip side of the push rod bracket assembly.
Figure 5:
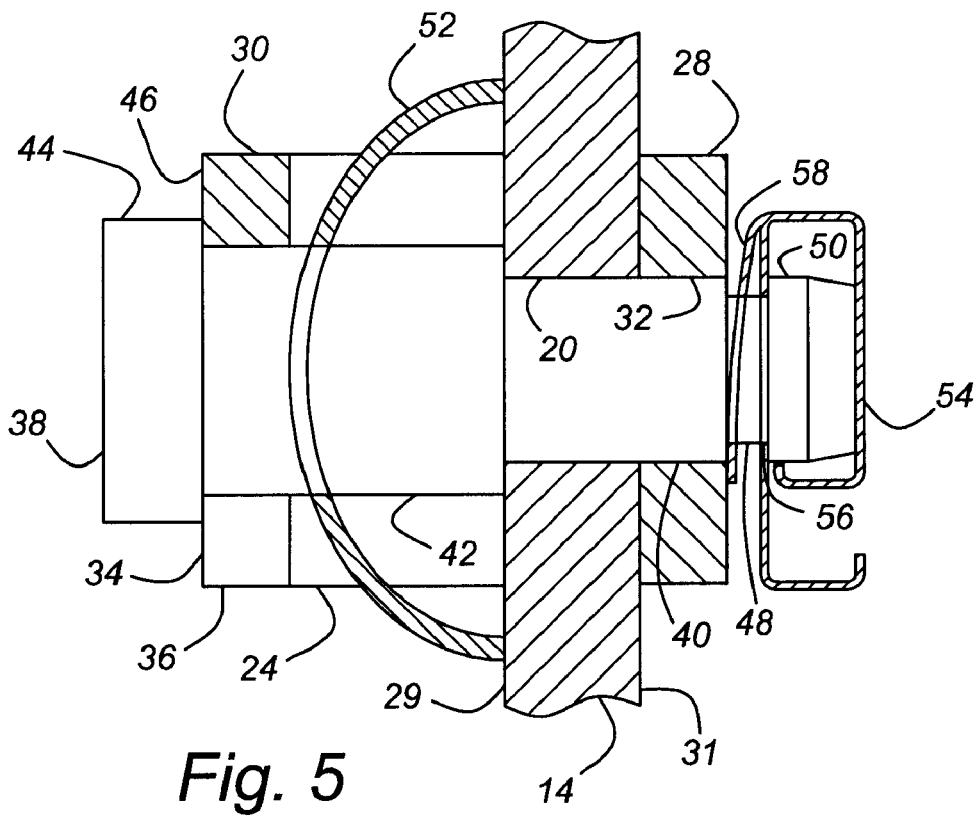
FIG. 5 is a schematic, cross-section view of the push rod bracket assembly attachment to a brake pedal arm, in accordance with the first embodiment.
Figure 6:
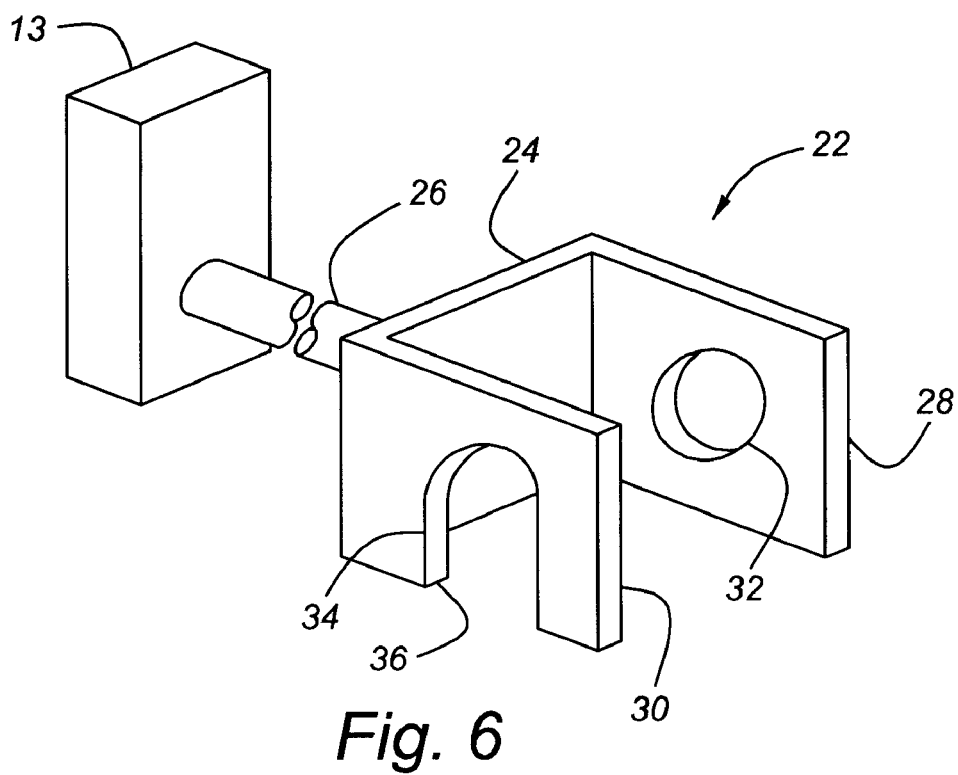
FIG. 6 is a schematic, perspective view of a booster clevis and booster assembly, in accordance with the first embodiment.
Figure 7:
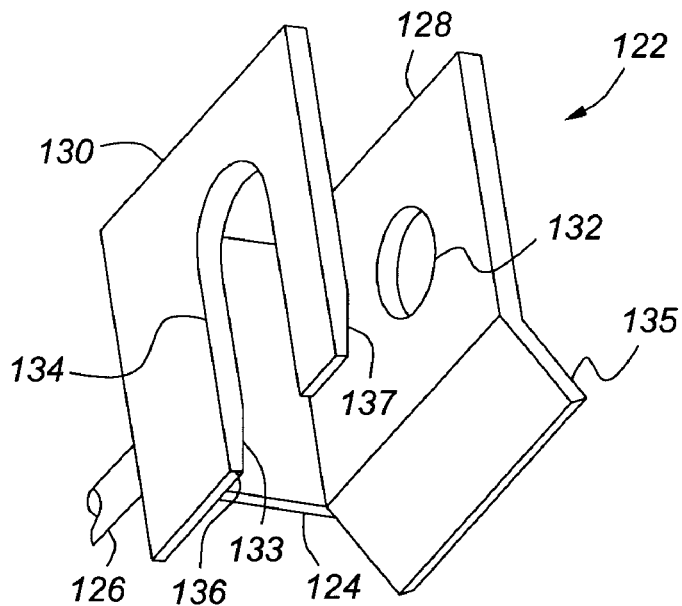
FIG. 7 is a schematic, perspective view of a booster clevis in accordance with a second embodiment.

FIGS. 1-6 illustrate a brake pedal assembly, indicated generally at 10, connected to a push rod bracket assembly, indicated generally at 12. The push rod bracket assembly 12 also engages a booster assembly 13 (indicated schematically in FIG. 6). The booster assembly 13 is known to those skilled in the art and so will not be discussed or shown in any more detail herein.

The brake pedal assembly 10 includes a brake pedal arm 14, with a brake pedal 16 at a lower end and an upper pivot shaft 18 near an upper end. The brake pedal assembly 10 also includes a bracket attachment hole 20 through the brake pedal arm 14, through which the brake pedal assembly 10 engages the push rod bracket assembly 12.

The push rod bracket assembly 12 includes a booster clevis 22 having a pushrod support wall 24, with a booster push rod 26 extending outward therefrom into engagement with the booster assembly 13. Extending away from the pushrod support wall 24 are two spaced apart legs—a retainer clevis leg 28 and a slotted clevis leg 30. The retainer clevis leg 28 mounts on a first side 29 of the brake pedal arm 14 and includes a pin hole 32 that aligns with the bracket attachment hole 20. The slotted clevis leg 30 is spaced from an opposed second side 31 of the brake pedal arm 14 and includes a pin slot 34 that, in general, aligns with the bracket attachment hole 20 at the upper end of the pin slot 34. The pin slot 34 includes a slot opening 36 through the bottom of the slotted clevis leg 30.

A pedal attachment pin 38 includes a pedal arm attachment portion 40 that is mounted and secured in the bracket attachment hole 20 in the brake pedal arm 14. The method used for securing the pedal attachment pin 38 to the pedal arm 14 can be accomplished through various means, such as, for example, various types of peening operations, orbital riveting, staking, or other suitable methods. The pedal attachment pin 38 is fixed to the brake pedal arm 14 in order to assure that the attachment pin 38 will not slip out of the bracket attachment hole 20—even if a retainer clip (discussed below) is missing or broken. The pedal arm attachment portion 40 extends outward beyond the bracket attachment hole 20 in the brake pedal arm 14 through the pin hole 32 in the retainer clevis leg 28. A smaller diameter retainer neck portion 48 extends from the pedal arm attachment portion 40, and a retainer portion 50—having a larger diameter than the retainer neck portion 48—extends from the retainer neck portion 48.

The pedal attachment pin 38 also includes a spacer shaft portion 42 adjacent to the pedal arm attachment portion 40. This spacer shaft portion 42 extends outward from the brake pedal arm 14 into engagement with the pin slot 34 in the slotted clevis leg 30. A retention head portion 44 of the pedal attachment pin 38 is adjacent to the spacer shaft portion 42 and has a diameter that is larger than the opening of the pin slot 34 in order to engage an outer surface 46 of the slotted clevis leg 30 around the pin slot 34.

A wave washer 52 is mounted about the spacer shaft portion 42 between the brake pedal arm 14 and the slotted clevis leg 30. The wave washer 52 biases the slotted clevis leg 30 away from the brake pedal arm 14, which causes the retainer clevis leg 28 to be biased against the brake pedal arm 14. While a wave washer 52 is illustrated, other types of mechanisms for biasing the retainer clevis leg 28 away from the brake pedal arm 14 may be employed instead if so desired.

A retainer clip 54 mounts over the retainer portion 50 and engages the retainer neck portion 48 of the pedal attachment pin 38. A retention slot 56 slides over the retainer neck portion 48 but has an opening small enough that it seats against and is retained by the retainer portion 50. Spring tabs 58 help assure that the retainer clip 54 stays secure on the pedal attachment pin 38. While a retainer clip 54 is illustrated, other types of mechanisms for preventing the retainer clevis leg 28 from sliding off the end of the pedal attachment pin 38 may be employed instead if so desired. For example, a cotter pin type of arrangement may be employed.

An installation process for assembling the push rod bracket assembly 12 to the brake pedal assembly 10 will now be described. The pedal attachment pin 38 is installed in the bracket attachment hole 20 of the brake pedal arm 14 and fixed in place by a securing method, such as those discussed above. The wave washer 52 is installed around the spacer shaft portion 42 of the pedal attachment pin 38, preferably before the pedal attachment pin 38 is secured to the brake pedal arm 14. Then, the pin hole 32 of the retainer clevis leg 28 is slid over the retainer portion 50 and onto the pedal arm attachment portion 40 of the pedal attachment pin 38 as the slot opening 36 of the slotted clevis leg 30 is slid over the spacer shaft portion 42 between the wave washer 52 and the retention head portion 44. The retainer clip 54 is then secured to the retainer neck portion 48 and around the retainer portion 50 of the pedal attachment pin 38.

One will note that the slot opening 36 allows the booster clevis 22 to be assembled to the pedal attachment pin 38 with ease even though the pedal attachment pin 38 is already fixed to the brake pedal arm 14. The pedal attachment pin 38 being fixed to the brake pedal arm 14 is advantageous because the wave washer 52 will cause the retainer clevis leg 28 to be biased against the brake pedal arm 14 without the pedal attachment pin 38 pulling out of the bracket attachment hole 20. Consequently, should the retainer clip 54 be inadvertently left off the assembly or break, the retainer clevis leg 28 will remain securely against the brake pedal arm 14 rather than slipping off the end of the pedal attachment pin 38. The booster clevis 22 will remain securely on the pedal attachment pin 38 and in the proper position for the brake pedal assembly 10, allowing the booster push rod 26 to properly engage the booster assembly 13.

FIGS. 7-12 illustrate a second embodiment of the push rod bracket assembly 112. In this embodiment, similar elements are similarly designated, but using 100-series numbers.

The pedal attachment pin 138 still includes a pedal arm attachment portion 140 that is received in the bracket attachment hole 120 of the brake pedal arm 114, with the pin 138 fixed to the arm 114. However, the retainer portion 150 may now have a rounded head opposite retention neck portion 148, rather than a chamfered head. Also, a wave washer 152 is still mounted around a spacer shaft portion 142 of the pedal attachment pin 138 and engages a first side of the brake pedal arm 129. However, the spacer shaft portion 142 now tapers radially downward from near the retention head portion 144 toward the pedal arm attachment portion 140, with the diameter of the spacer shaft portion 142 being large enough near the retention head portion 144 to prevent the wave washer 152 from contacting the retention head portion 144. That is, the inside diameter of the wave washer 152 is large enough to fit over the spacer shaft portion 142 closer to the pedal arm attachment portion 140, but is small enough that it catches on the spacer shaft portion 142 near but not at the retention head portion 144. Preferably, the inside diameter of the wave washer 152 is such that it will extend to within the thickness of the slotted clevis leg 130 of the booster clevis 122.

The booster clevis 122 still includes a booster push rod 126 extending from a push rod support wall 124, but the retainer clevis leg 128 and slotted clevis leg 130 are different than the first embodiment. The retainer clevis leg 128 includes a ramp 135 extending downward from the clevis leg 128 and outward away from the slotted clevis leg 130. Also, a retention flange 158 extends from the retainer clevis leg 128 adjacent to the pin hole 132, defining a retention hole 156. The pin hole 132 may taper radially inward toward the retention hole 156. The retention flange 158 includes a retainer spring slot 160, within which a generally circular retainer spring 154 is mounted. With the retainer spring 154 retained on the retention flange 158, it does not have to be assembled into the push rod bracket assembly 112 while being assembled to the brake pedal arm 114.

A lower portion of an inside surface 133 of the slotted clevis leg 130 includes a taper 137. The taper 137 causes the clevis leg 130 to become thinner as it extends downward toward the slot opening 136 of the pin slot 134. This taper 137 allows the slotted clevis leg 130 to easily slide in a gap formed between the wave washer 152 and the retention head portion 144, while allowing the wave washer 152 to be compressed somewhat when the full thickness of the slotted clevis leg 130 is located between the wave washer 152 and the retention head portion 144.

Figure 8:
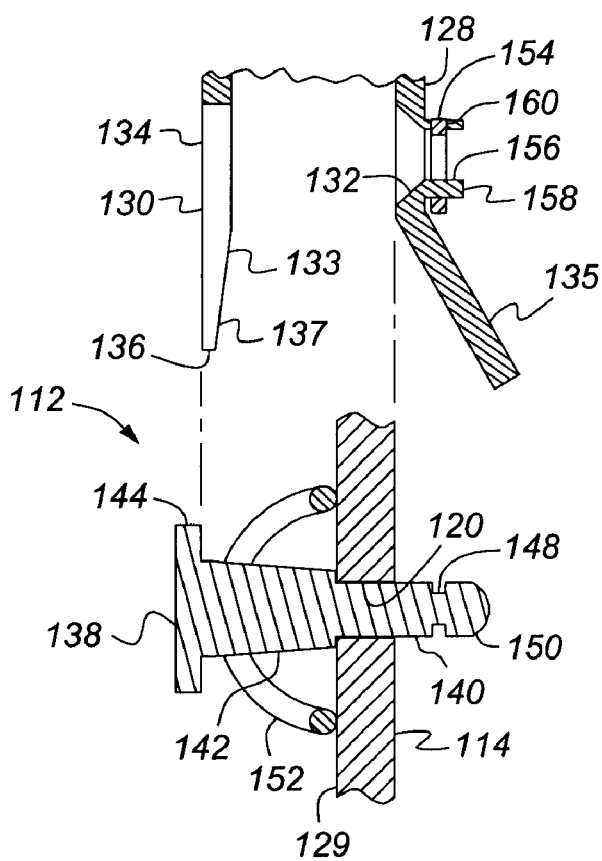
FIG. 8-12 are schematic, cross-section views showing the push rod bracket assembly being assembled to the brake pedal arm, in accordance with the second embodiment.

An installation process for assembling the push rod bracket assembly 112 to the brake pedal arm 114 will now be described. The wave washer 152 is assembled on the spacer shaft portion 142 of the pedal attachment pin 138, and the pedal arm attachment portion 140 is slid into the bracket attachment hole 120. The pedal attachment pin 138 is fixed to the brake pedal arm 114. The booster clevis 122 is aligned with the brake pedal arm 114 and pedal attachment pin 138, ready to be assembled, as shown in FIG. 8.

Figure 9:
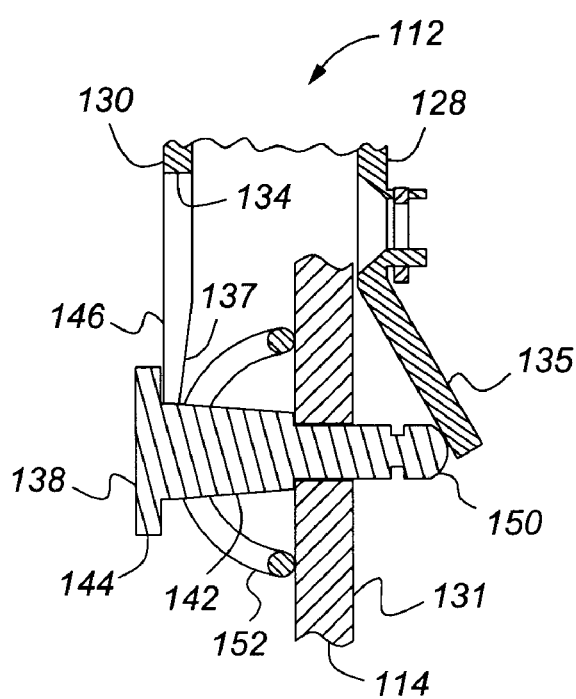

The retainer clevis leg 128 is aligned with the second side 131 of the brake pedal arm 114 and the slotted clevis leg 130 is aligned with the spacer shaft portion 142—in the gap between the retention head portion 144 and the wave washer 152—as shown in FIG. 9. The taper 137 assures that, with the outer surface 146 of the slotted clevis leg 130 near or against the retention head portion 144, the retainer clevis leg 130 will easily slip between the retention head portion 144 and the wave washer 152. Also, the ramp 135 is long enough to assure that it will be in contact with a sliding surface of the retainer portion 150, so the retainer head portion 150 does not catch on the ramp 135.

Figure 10:
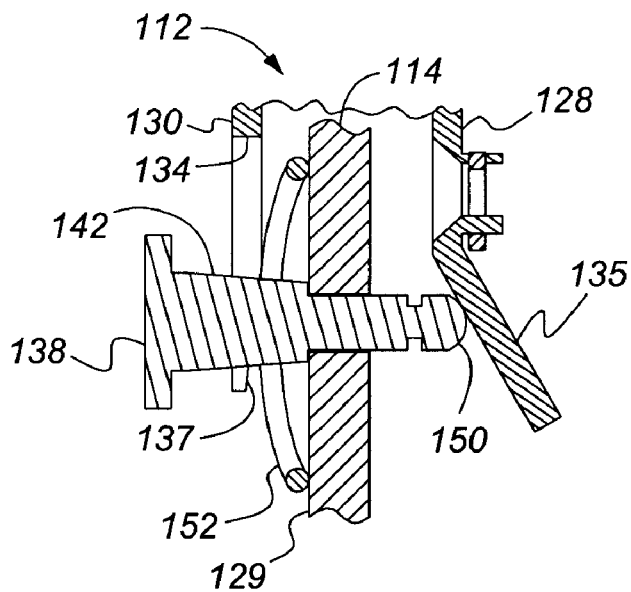

As the retainer clevis leg 128 is pushed down over the pedal attachment pin 138, the retainer portion 150 will push against and move the ramp 135 laterally. This will cause the slotted clevis leg 130 to begin compressing the wave washer 152 as the pin slot 134 begins to slide over the spacer shaft portion, as shown in FIG. 10. The tapering of the spacer shaft portion 142 also allows for additional play between the spacer shaft portion 142 and the pin slot 134 during the assembly process, which may allow for easier alignment of parts.

Figure 11:
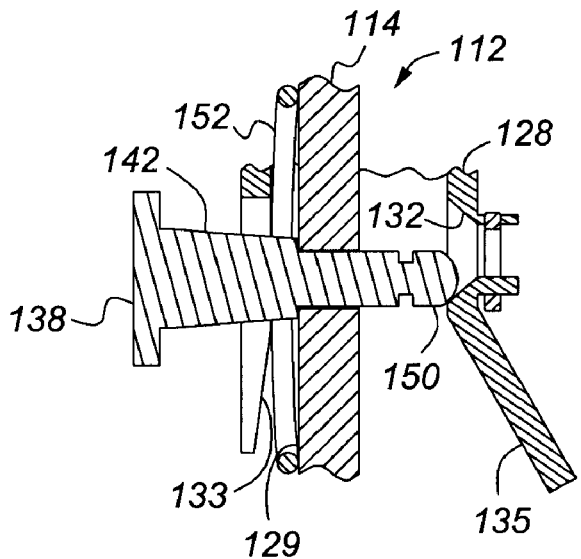

As the retainer clevis leg 128 continues to slide down over the pedal attachment pin 138, the wave washer 152 will continue to be compressed against the first side 129 of the brake pedal arm 114 until the retainer portion 150 encounters the pin hole 132, as shown in FIG. 11. The pin hole 132 is preferably tapered to make alignment of the retainer portion 150 and pin hole 132 easier.

Figure 12:
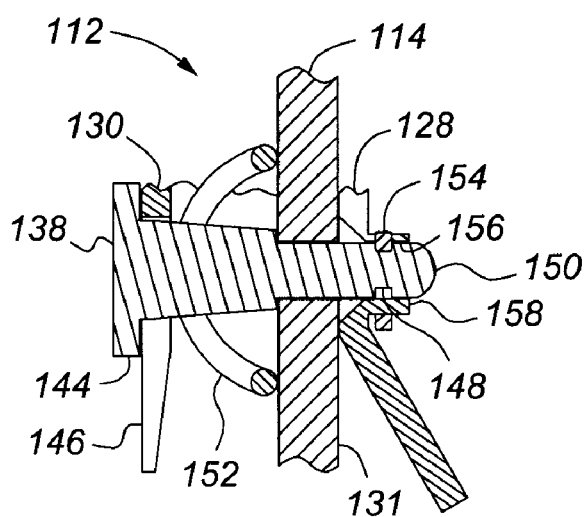

The spring force of the wave washer 152 will then push the slotted clevis leg 130 against the retention head portion 144 of the pedal attachment pin 138, forcing the retainer portion 150 through the retention hole 156 formed by the retention flange 158, as seen in FIG. 12. The retainer spring 154 will be elastically stretched as the retainer portion 150 slides through it, and then snap into the retainer neck portion 148. The retainer clevis leg 128 is now secured against the second side 131 of the brake pedal arm 114, and the outer surface 146 of the slotted clevis leg 130 is biased against the retention head portion 144. The assembly of the push rod bracket assembly 112 to the brake pedal arm 114 is now complete. One will note that the installer need only apply a force in one direction to slide the booster clevis 122 onto the pedal attachment pin 138, making assembly relatively easy and quick.

While certain embodiments of the present invention have been described in detail, those familiar with the art to which this invention relates will recognize various alternative designs and embodiments for practicing the invention as defined by the following claims.

What is claimed is:

1. A brake pedal and bracket assembly for engaging a booster assembly, the brake pedal and bracket assembly comprising:
    a brake pedal arm having a first side and an opposed second side, and a bracket attachment hole extending from the first side to the second side;
    a booster clevis including a push rod support wall having a booster push rod extending therefrom and adapted to engage the booster assembly, a first clevis leg extending from the push rod support wall and mounted adjacent to the first side, and a second clevis leg extending from the push rod support wall and adjacent to the second side, the first and second clevis legs each including a bore aligned with the bracket attachment hole;
    a pedal attachment pin, fixed to the brake pedal arm, having a pedal arm attachment portion extending through the bracket attachment hole, a spacer portion extending from the brake pedal arm attachment portion and through the bore in the first clevis leg, and a retention head portion extending from the spacer portion and engaging with the first clevis leg; and
    a biaser mounted between the first side of the brake pedal arm and the first clevis leg, and biasing the first clevis leg away from the first side.

2. The brake pedal and bracket assembly of claim 1 wherein the biaser is a wave washer mounted around the spacer portion of the pedal attachment pin.

3. The brake pedal and bracket assembly of claim 2 wherein the spacer portion has a substantially conical shape that tapers radially downward from the retention head portion toward the pedal arm attachment portion.

4. The brake pedal and bracket assembly of claim 1 wherein the bore in the first clevis leg is a slot that includes a slot opening through an edge of the first clevis leg configured to allow the first clevis leg to be slidable around the spacer portion of the pedal attachment pin through the slot opening.

5. The brake pedal and bracket assembly of claim 1 wherein the pedal attachment pin includes a retainer portion extending from the brake pedal arm attachment portion and through the bore in the second clevis leg, and wherein the spacer portion has a substantially conical shape that tapers down radially from the retention head pin portion toward the pedal arm attachment portion.

6. The brake pedal and bracket assembly of claim 1 wherein the pedal attachment pin includes a retainer portion extending from the brake pedal arm attachment portion and through the bore in the second clevis leg, and wherein a retainer clip is mounted on the retainer portion and blocks the second retainer leg from sliding off of the pedal attachment pin.

7. The brake pedal and bracket assembly of claim 1 wherein the second clevis leg includes a ramp, the ramp angling away from the first clevis leg as the ramp extends away from the bore in the second clevis leg.

8. The brake pedal and bracket assembly of claim 2 wherein the pedal attachment pin is fixed to the brake pedal arm by one of a peening, orbital riveting, or staking operation.

9. The brake pedal and bracket assembly of claim 1 wherein the pedal attachment pin includes a retainer portion extending through the bore in the second clevis leg, the second clevis leg includes a retention flange extending from the second clevis leg around the perimeter of the bore in the second clevis leg, and a retainer spring is mounted on the retention flange in engagement with the retainer portion.

10. The brake pedal and bracket assembly of claim 1 wherein the bore in the first clevis leg is a slot that includes a slot opening through an edge of the first clevis leg configured to allow the first clevis leg to be slidable around the spacer portion of the pedal attachment pin through the slot opening, and the spacer portion has a diameter smaller than a width of the slot and the retention head portion has a diameter that is larger than the width of the slot.

11. A brake pedal and bracket assembly for engaging a booster assembly, the brake pedal and bracket assembly comprising:
   a brake pedal arm having a first side and an opposed second side, and a bracket attachment hole extending from the first side to the second side;
   a booster clevis including a push rod support wall having a booster push rod extending therefrom and adapted to engage the booster assembly, a first clevis leg extending from the push rod support wall and mounted adjacent to the first side, and a second clevis leg extending from the push rod support wall and adjacent to the second side, the first and second clevis legs each including a bore aligned with the bracket attachment hole, and the second clevis leg including a ramp, the ramp angling away from the first clevis leg as the ramp extends away from the bore in the second clevis leg;
   a pedal attachment pin, fixed to the brake pedal arm, having a pedal arm attachment portion extending through the bracket attachment hole, a spacer portion extending from the brake pedal arm attachment portion and through the bore in the first clevis leg, and a retention head portion extending from the spacer portion and engaging with the first clevis leg; and
   a biaser mounted between the first side of the brake pedal arm and the first clevis leg, and biasing the first clevis leg away from the first side.

12. A brake pedal and bracket assembly for engaging a booster assembly, the brake pedal and bracket assembly comprising:
   a brake pedal arm having a first side and an opposed second side, and a bracket attachment hole extending from the first side to the second side;
   a booster clevis including a push rod support wall having a booster push rod extending therefrom and adapted to engage the booster assembly, a first clevis leg extending from the push rod support wall and mounted adjacent to the first side, and a second clevis leg extending from the push rod support wall and adjacent to the second side, the first and second clevis legs each including a bore aligned with the bracket attachment hole; and
   a pedal attachment pin, fixed to the brake pedal arm, having a pedal arm attachment portion extending through the bracket attachment hole, a spacer portion extending from the brake pedal arm attachment portion and through the bore in the first clevis leg, and a retention head portion extending from the spacer portion and engaging with the first clevis leg; wherein the bore in the first clevis leg is a slot that includes a slot opening through an edge of the first clevis leg configured to allow the first clevis leg to be slidable around the spacer portion of the pedal attachment pin through the slot opening.

13. The brake pedal and bracket assembly of claim 12 wherein the bore in the first clevis leg is a slot that includes a slot opening through an edge of the first clevis leg configured to allow the first clevis leg to be slidable around the spacer portion of the pedal attachment pin through the slot opening, and the spacer portion has a diameter smaller than a width of the slot and the retention head portion has a diameter that is larger than the width of the slot.

14. The brake pedal and bracket assembly of claim 12 wherein the bore in the first clevis leg is a slot that includes a slot opening through an edge of the first clevis leg configured to allow the first clevis leg to be slidable around the spacer portion of the pedal attachment pin through the slot opening, and the first clevis leg includes a taper in thickness down toward the slot opening.

15. The brake pedal and bracket assembly of claim 12 including a biaser mounted between the first side of the brake pedal arm and the first clevis leg and configured to bias the first clevis leg away from the first side.

* * * * *